United States Patent
Kim et al.

(10) Patent No.: US 10,595,348 B2
(45) Date of Patent: Mar. 17, 2020

(54) METHOD FOR USING PS DATA OFF FUNCTION AND USER EQUIPMENT

(71) Applicant: LG Electronics Inc., Seoul (KR)

(72) Inventors: Jaehyun Kim, Seoul (KR); Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/464,899

(22) PCT Filed: Jul. 31, 2017

(86) PCT No.: PCT/KR2017/008209
§ 371 (c)(1),
(2) Date: May 29, 2019

(87) PCT Pub. No.: WO2018/101574
PCT Pub. Date: Jun. 7, 2018

(65) Prior Publication Data
US 2019/0289646 A1    Sep. 19, 2019

Related U.S. Application Data

(60) Provisional application No. 62/453,516, filed on Feb. 2, 2017, provisional application No. 62/427,160, filed on Nov. 29, 2016.

(51) Int. Cl.
*H04W 76/10* (2018.01)
*H04W 8/02* (2009.01)
*H04W 28/02* (2009.01)
*H04W 76/18* (2018.01)

(52) U.S. Cl.
CPC ............ *H04W 76/10* (2018.02); *H04W 8/02* (2013.01); *H04W 28/0289* (2013.01); *H04W 76/18* (2018.02)

(58) Field of Classification Search
CPC ..... H04W 76/10; H04W 76/20; H04W 76/30; H04W 64/00; H04W 8/08; H04W 8/26;
(Continued)

(56) References Cited

U.S. PATENT DOCUMENTS

2012/0275401 A1* 11/2012 Sun ..................... H04W 76/18
370/329
2014/0064069 A1    3/2014 Liao
(Continued)

OTHER PUBLICATIONS

"3rd Generation Partnership Project; Technical Specification Group Core Network and Terminals; Non-Access-Stratum (NAS) protocol for Evolved Packet System (EPS); Stage 3 (Release 14)," 3GPP TS 24.301 V14.1.0 (Sep. 2016), Sep. 26, 2016, 462 pages.
(Continued)

*Primary Examiner* — Ashley Shivers
(74) *Attorney, Agent, or Firm* — Fish & Richardson P.C.

(57) ABSTRACT

One disclosure of the present specification provides a method for using packet switching (PS) data off function in user equipment (UE). The method can comprise the steps of: determining whether a session management (SM) delay time timer or a mobility management (MM) delay time timer is being operated, in a state in which the transmission of a non-access stratum (NAS) request message for an SM is required according to a request for the activation or the inactivation of the PS data off function; and, according to the result of the determination, allowing an NAS layer of the UE to include activation or inactivation state information of the PS data off function in the NAS request message for an SM and transmit the same.

18 Claims, 11 Drawing Sheets

(58) Field of Classification Search
CPC ... H04W 28/0226; H04W 6/32; H04W 48/04;
H04W 52/285; H04L 1/1851; H04L
1/1883; H04L 29/06993; H04L 69/28;
H04L 29/06326; H04L 29/08576; H04L
67/14; H04L 49/00; H04L 12/56; H04L
41/00; H04L 43/00; H04L 47/00; H04L
65/1066; H04L 47/70
See application file for complete search history.

(56) References Cited

U.S. PATENT DOCUMENTS

| | | | |
|---|---|---|---|
| 2014/0126361 A1* | 5/2014 | Tiwari | H04W 76/12 370/230 |
| 2015/0195809 A1 | 7/2015 | Sun et al. | |
| 2015/0256961 A1 | 9/2015 | Kim et al. | |
| 2019/0223093 A1* | 7/2019 | Watfa | H04W 36/06 |

OTHER PUBLICATIONS

"3rd Generation Partnership Project; Technical Specification Group Services and System Aspects; Service accessibility (Release 14)," 3GPP TS 22.011 V14.3.0 (Jun. 2016), Jun. 24, 2016, 31 pages.

3rd Generation Partnership Project; Technical Specification Group Services and System Aspects; "Study on 3GPP PS Data Off; (Release 14),"3GPP TR 23.702 V1.2.0, dated Nov. 25, 2016, 64 pages.

Extended European Search Report in European Application No. 17876984.0, dated Oct. 9, 2019, 72 pages.

\* cited by examiner

METHOD FOR USING PS DATA OFF FUNCTION AND USER EQUIPMENT

CROSS-REFERENCE TO RELATED APPLICATIONS

This application is a National Stage application under 35 U.S.C. § 371 of International Application No. PCT/KR2017/008209, filed on Jul. 31, 2017, which claims the benefit of U.S. Provisional Application No. 62/453,516, filed on Feb. 2, 2017, and U.S. Provisional Application No. 62/427,160, filed on Nov. 29, 2016. The disclosures of the prior applications are incorporated by reference in their entirety.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |

TABLE 1-continued

| REFERENCE POINT | DESCRIPTION |
| --- | --- |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARD). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

<Congestion Control by a Network>

When congestion occurs, the node (MME, SGSN) of a core network avoids or controls signaling congestion and APN congestion by performing NAS level congestion control.

Such NAS level congestion control includes APN-based congestion control and general NAS level mobility management control.

The APN-based congestion control means EMM, GMM and (E)SM signaling congestion control related to a UE and a specific APN (APN associated with a congestion state), and includes APN-based session management congestion control and APN-based mobility management congestion control.

In contrast, the general NAS level mobility management control means that a node (MME, SGSN) within a core network avoids congestion and an overload by rejecting a mobility management signaling request requested by a UE/MS in general network congestion or an overload condition.

In general, when a core network performs NAS level congestion control, it carries a back-off timer value on an NAS Reject message and transmits the message to a UE in an idle mode or a connected mode 로. The UE does not request an EMM/GMM/(E)SM signal from the network until a back-off timer expires. The NAS Reject message corresponds to one of ATTACH REJECT, tracking area updating (TAU)/routing area updating (RAU) REJECT, service REJECT, extended service REJECT, PDN connectivity REJECT, bearer resource allocation REJECT, bearer resource modification REJECT, or REJECT for a deactivate EPS bearer context request.

The back-off timer may be divided into a mobility management (MM) back-off timer and a session management (SM) back-off timer.

The MM back-off timer independently runs per UE, and the SM back-off timer independently runs per APN and per UE.

In brief, the MM back-off timer is for EMM/GMM signal (e.g., Attach, TAU/RAU request) control. The SM back-off timer is for (E)SM signal (e.g., PDN connectivity, Bearer Resource Allocation, Bearer Modification, PDP Context Activation, PDP Context Modification request) control.

Specifically, the MM back-off timer is a mobility-related back-off timer used to control congestion when the congestion occurs in a network. While the timer runs, a UE cannot perform Attach, location information updating (TAU, RAU), a service request procedure. However, in the case of emergency bearer service, multimedia priority service (MPS), the UE can exceptionally make a request although the timer runs.

As described above, a UE may receive an MM back-off timer value from a core network node (e.g., MME, SGSN) or from a lower layer (access stratum). Furthermore, an MM back-off timer value may be randomly set by the UE within a range between 15 minutes and 30 minutes.

On the one hand, the SM back-off timer is a session management-related back-off timer used to control congestion when the congestion occurs in a network. While the timer runs, a UE cannot configure or change an associated APN-based session. However, likewise, in the case of emergency bearer service, multimedia priority service (MPS), the UE (device) can exceptionally make a request although the timer runs.

A UE receives such an SM back-off timer value from a core network node (e.g., MME, SGSN), and the SM back-off timer value is randomly set within a maximum of 72 hours. Furthermore, an SM back-off timer value may be randomly set by a UE within a range between 15 minutes and 30 minutes.

On the other hand, an (e)NodeB may also perform congestion control. In an RAN or core network congestion situation, when a UE performs an RRC/RR(C) connection establishment procedure, it may receive a REJECT response from an (e)NodeB along with an extended back-off timer. In such a case, the UE does not initiate an EMM/GMM procedure until an extended back-off timer received from the (e)NodeB expires (accordingly, the UE does not initiate the RRC/RR(C) connection establishment procedure). The UE considers and uses the extended back-off timer as an MM back-off timer.

FIGS. 6a and 6b show procedures of rejecting, by a UE, an MM operation or SM operation upon network congestion or overload.

As may be seen with reference to FIG. 6a, upon network congestion or an overload, when a UE 100 performs Attach, a tracking area update (TAU) procedure, routing area update (RAU) or a service request procedure through an (e)NodeB 200, a node within a network, for example, an MME/SGSN 510 transmits a Reject message for the Attach request, TAU request, RAU request or service request based on the situation of the network, such as an operator policy.

Furthermore, the MME/SGSN 510 may transmit a back-off timer through the Reject message while transmitting the Reject message so that the UE 100 does not reattempt a connection until the period of back-off timer expires.

Alternatively, as in FIG. 6b, upon network congestion or an overload, a node within a network, for example, the MME/SGSN 510 may deliver a back-off timer to the UE 100 via the (e)NodeB 200 based on the situation of the network, such as an operator policy. The back-off timer may be included in a message (e.g., Deactivate EPS Bearer Context request, Deactivate PDP context request) transmitted from the MME/SGSN 510 to the UE 100.

Meanwhile, information that may be included if the Reject message is a TAU Reject message is shown in the following table.

TABLE 2

| Information | Description |
| --- | --- |
| Protocol discriminator | Discriminator to identify a protocol |
| Security header type | Type of header used for security |
| TAU Reject message ID | Identifier of a message |
| EMM cause | Indicate the cause of reject |
| T3346 value | MM back-off timer (or MM back-off timer) |

Meanwhile, information that may be included if the message is a Deactivate EPS Bearer Context request message is shown in the following table.

TABLE 3

| Information | Description |
| --- | --- |
| Protocol discriminator | Discriminator to identify a protocol |
| EPS bearer ID | Identifier of an EPS bearer |
| Procedure transaction ID | Procedure transaction ID |
| Deactivate EPS bearer context request message ID | Identifier of a message |
| ESM cause | Indicate the cause of reject |
| Protocol configuration options | Protocol-related information |
| T3396 value | SM back-off timer (or SM back-off timer) |

Meanwhile, the eNodeB 200 may also perform congestion control. For example, the eNodeB 200 may perform congestion control as in FIG. 6c with respect to an RRC connection request.

FIG. 6c shows an example in which an RRC connection is rejected.

As may be seen with reference to FIG. 6c, when the UE 100 in an idle state wants to establish an RRC connection in order to attempt data transmission, it transmits an RRC connection request message to the eNodeB 200.

In this case, if the eNodeB 200 is an overload state, the eNodeB 200 transmits an RRC Connection Reject message to the UE 100. The RRC Connection Reject message may include an extended back-off timer. The extended back-off timer is a wait time of a second unit for a delay tolerant access request. The extended back-off timer may be designated as a maximum of 1800 seconds (i.e., 30 minutes).

Meanwhile, there is a problem in that a mobile communication network is congested due to an explosive increase in the amount of data used by users, but there is a problem in that a user must pay a more service fee.

Accordingly, there is a need to limit the transmission and reception of unimportant data (e.g., data that generates an application operated in background) or unwanted data.

However, there is a problem in that there has not yet been proposed a technology capable of satisfying such a need.

SUMMARY OF THE INVENTION

The present invention provides a scheme capable of solving the above-described problems.

Accordingly, in an effort to solve the aforementioned problem, a disclosure of the present specification provides a method for using a packet switching (PS) data off function. The method may be performed by a user equipment (UE) and comprise: determining whether a session management (SM) back-off timer or a mobility management (MM) back-off timer is running, if a non-access stratum (NAS) request message for an SM needs to be transmitted due to an activation request or a deactivation request of the PS data off function; and transmitting, by an NAS layer of the UE, the NAS request message for the SM including information on an activation status or a deactivation status of the PS data off function.

The method may further comprise: overriding or stopping the SM back-off timer or the MM back-off timer before the SM back-off timer or the MM back-off timer expires, if it is determined that the SM back-off timer or the MM back-off timer is running.

The NAS request message for the SM may include: cause information representing why the SM back-off timer or the MM back-off timer is overridden, or an indicator representing that the NAS request message is not configured with a low priority.

The method may further comprise: recoding in a timestamp a time point when the PS data off function needs to be activated or deactivated, if it is determined that the SM back-off timer or the MM back-off timer is running; and wherein the NAS request message for the SM is transmitted when the SM back-off timer or the MM back-off timer expires.

The NAS request message for the SM may include: information on a difference value between the time point identified by the timestamp and a time point when the SM back-off timer or the MM back-off timer expires.

The NAS request message for the SM may further include the timestamp.

The method may further comprise: overriding or stopping the MM back-off timer before the MM back-off timer expires, if it is determined that the MM back-off timer is running; and transmitting a NAS request message for the MM before transmitting the NAS request message for the SM.

The method may further comprise: delivering, by the NAS layer and to a radio resource control (RRC) layer, an indication for instructing to skip a barring check for an access control, a call type, a value for an RRC establishment cause field or category information, if an RRC connection establishment procedure is needed before transmitting the NAS request message for the MM.

The access control may include at least one of: an access class barring (ACB), an extended access barring (EAB), and an application specific congestion control for data communication (ACDC).

The NAS request message for the MM further may include: cause information representing why the SM back-off timer or the MM back-off timer is overridden, or an indicator representing that the NAS request message is not configured with a low priority.

Accordingly, in an effort to solve the aforementioned problem, a disclosure of the present specification provides a user equipment (UE) for using a packet switching (PS) data off function. The UE may comprise: a transceiver; and a processor which controls the transceiver. The processor performs: determining whether a session management (SM) back-off timer or a mobility management (MM) back-off timer is running, if a non-access stratum (NAS) request message for an SM needs to be transmitted due to an activation request or a deactivation request of the PS data off function; and transmitting, by an NAS layer, the NAS request message for the SM including information on an activation status or a deactivation status of the PS data off function.

According to the present disclosure, the aforementioned problems of the related art may be solved.

DESCRIPTION OF EXEMPLARY EMBODIMENTS

Figure 1:
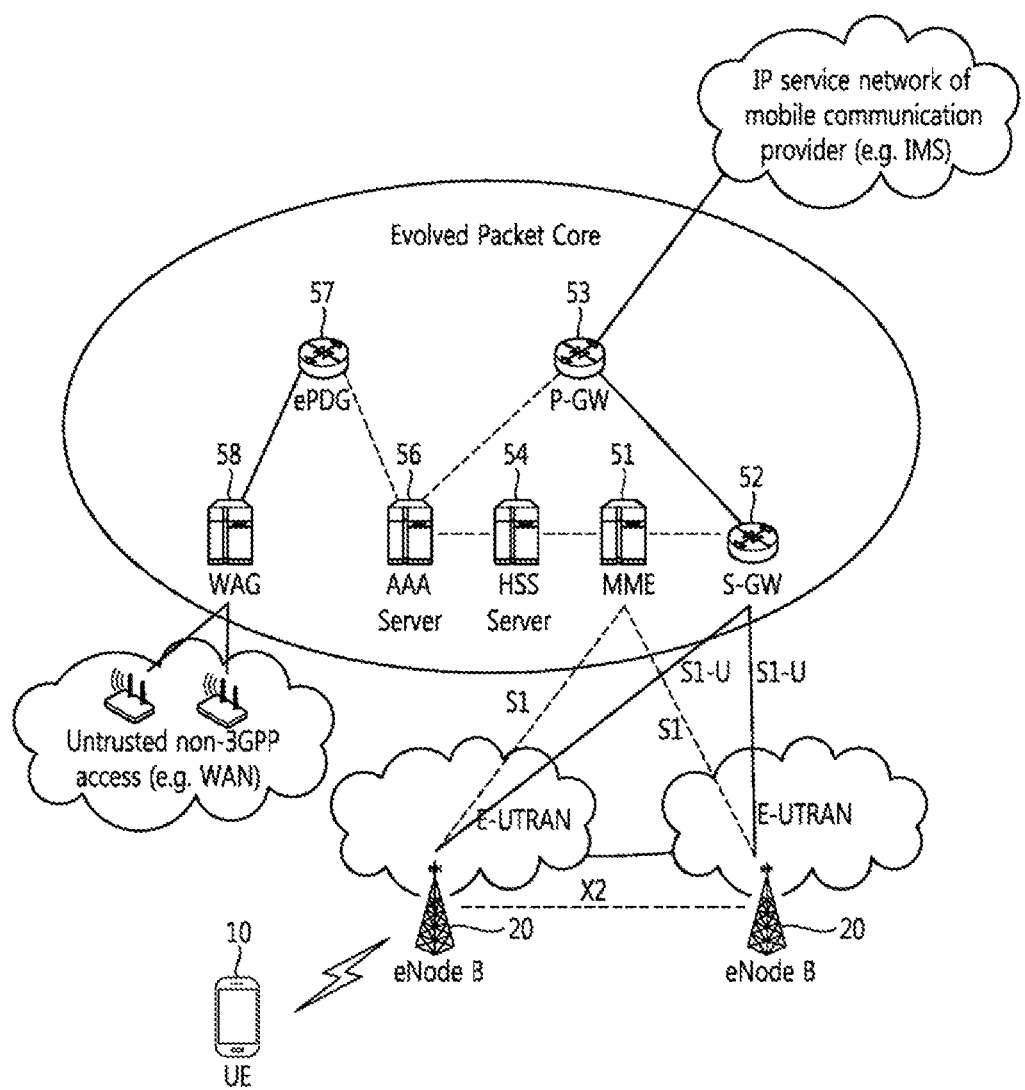
FIG. 1 is a structural diagram of an evolved mobile communication network.
Figure 2:
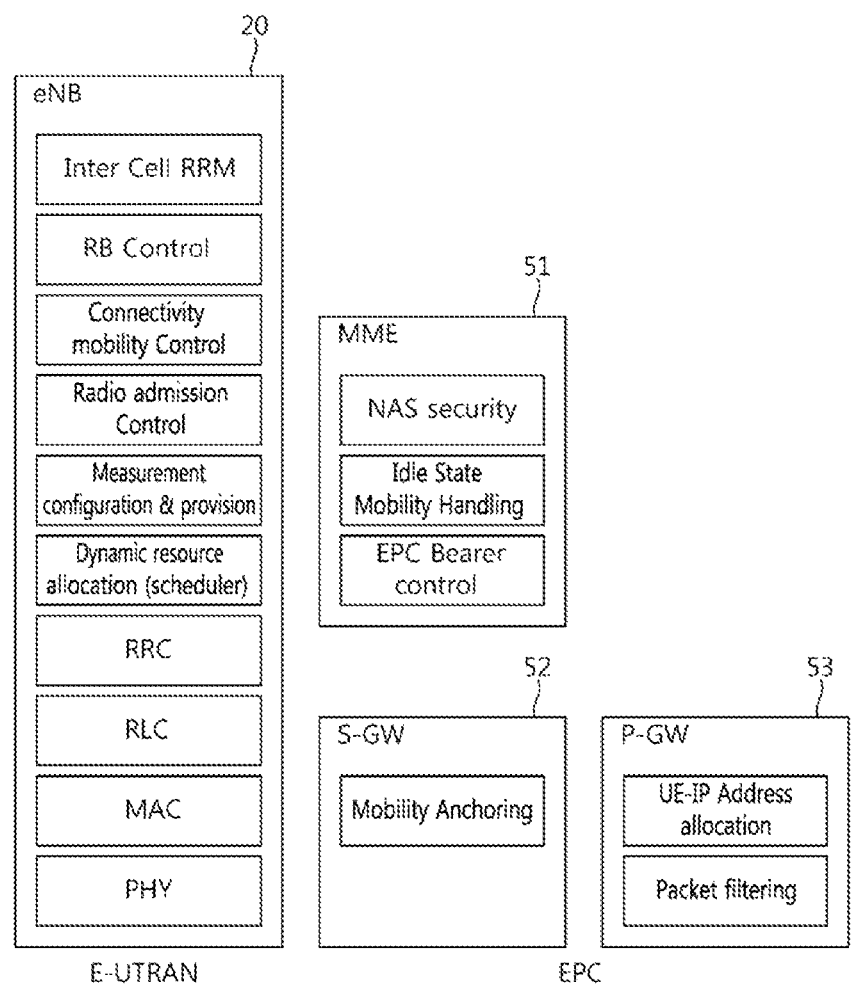
FIG. 2 is an exemplary diagram illustrating architectures of a general E-UTRAN and a general EPC.
Figure 3:
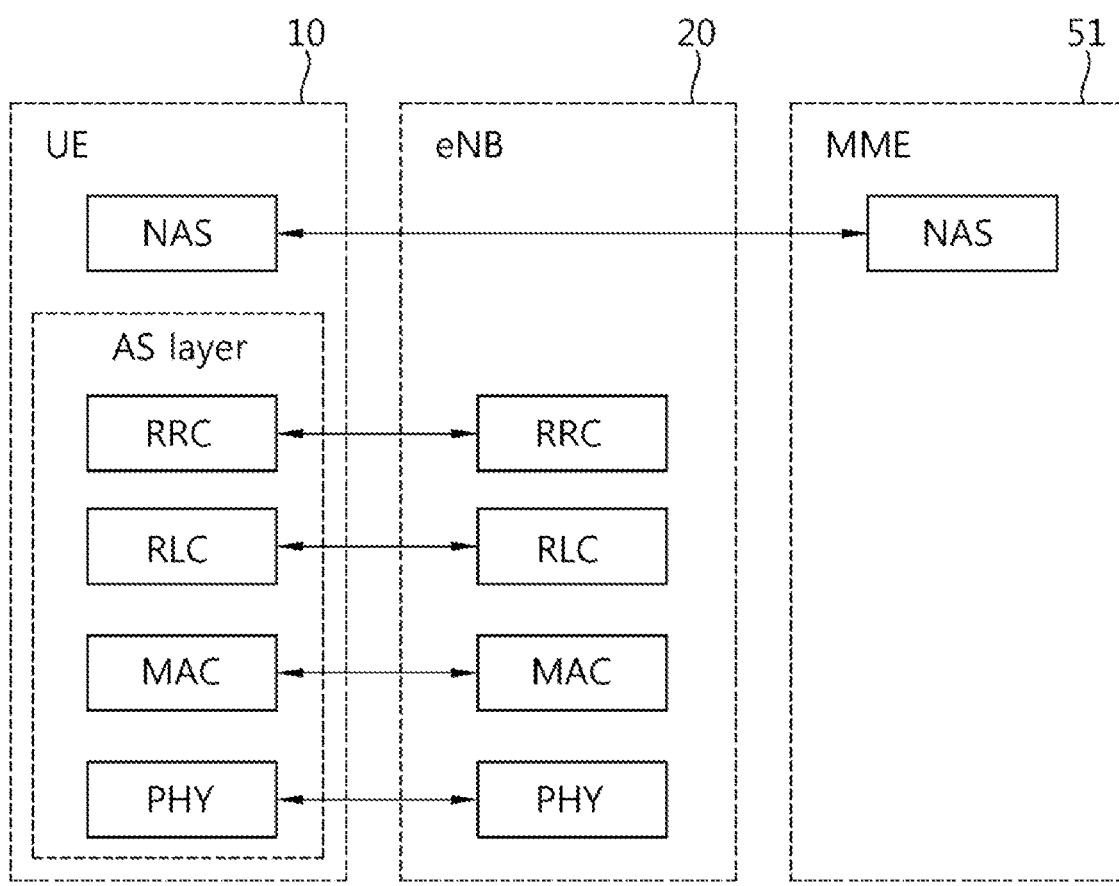
FIG. 3 is an exemplary diagram illustrating a structure of a radio interface protocol on a control plane between UE and eNodeB.
Figure 4:
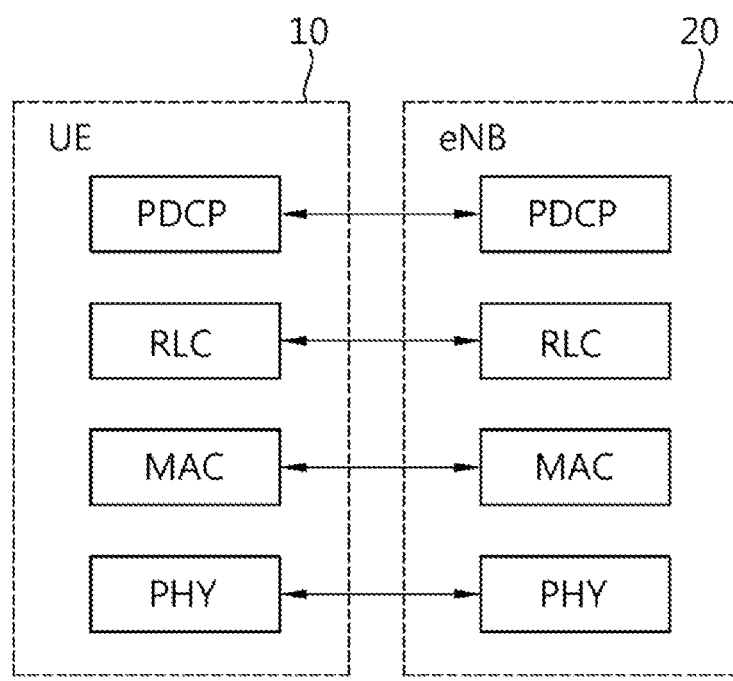
FIG. 4 is another exemplary diagram illustrating a structure of a radio interface protocol on a user plane between the UE and a base station.
Figure 5A:
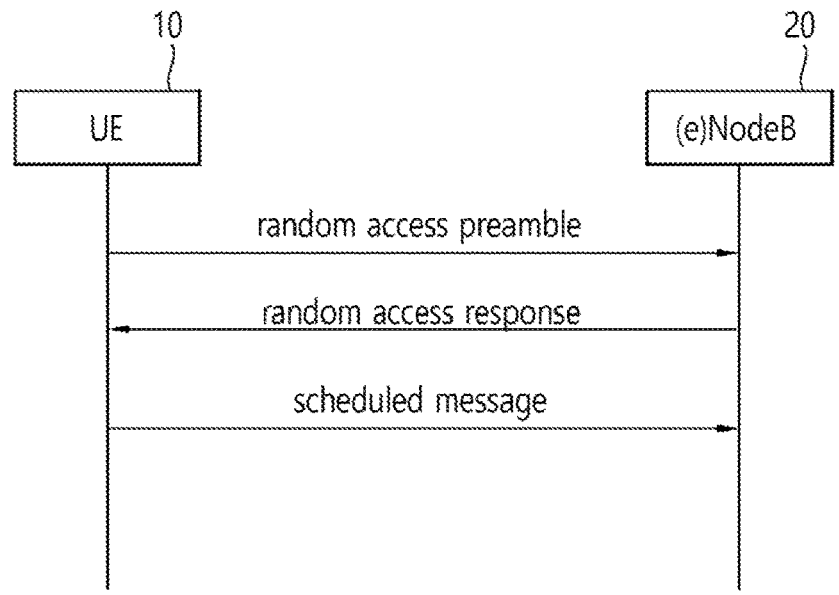
FIG. 5a is a flowchart illustrating a random access process in 3GPP LTE.
Figure 5B:
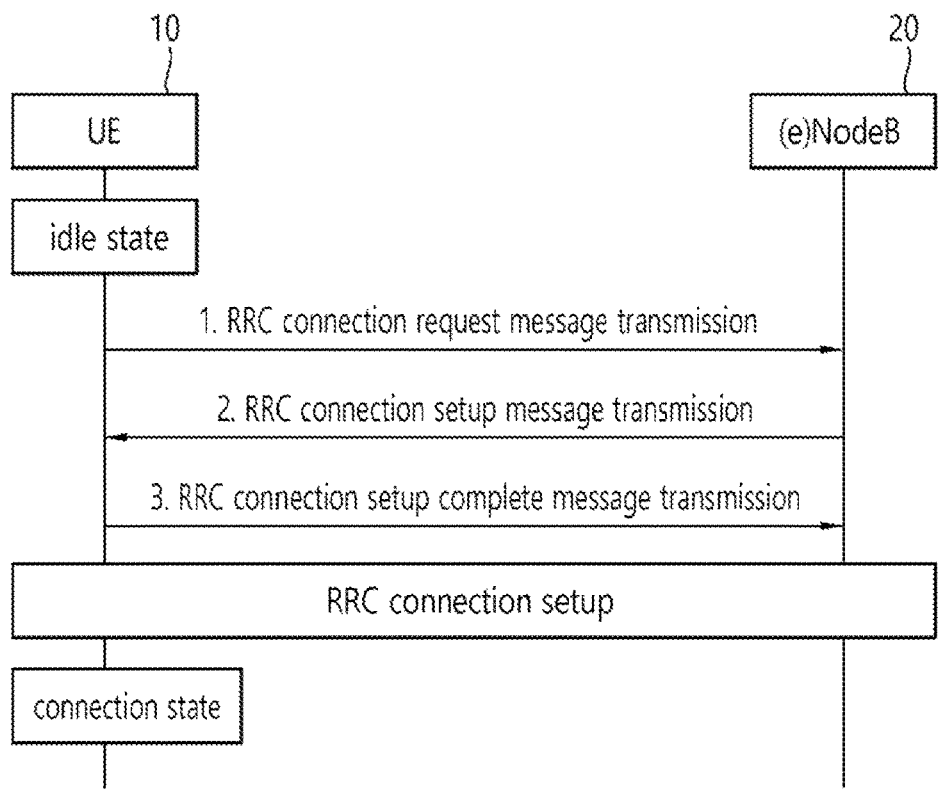
FIG. 5b illustrates a connection process in a radio resource control (RRC) layer.
Figure 6A:
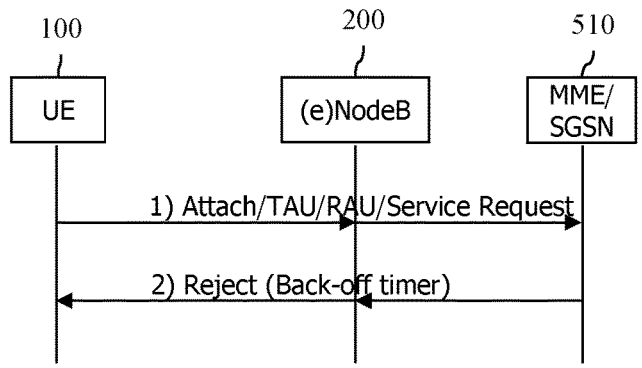
FIGS. 6a and 6b show procedures of rejecting, by a UE, an MM operation or SM operation upon network congestion or overload.
Figure 6B:
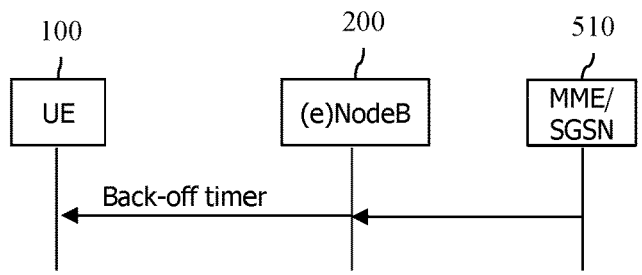
Figure 6C:
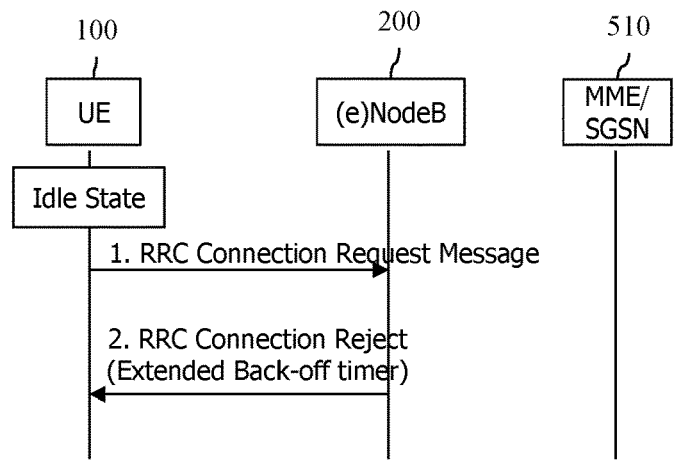
FIG. 6c shows an example in which an RRC connection is rejected.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A Serving gateway (Serving GW) is a network node of an EPS network which performs functions, such as mobility anchor, packet routing, idle mode packet buffering, and triggering an MME to page UE.

An eNodeB is an eNodeB of an Evolved Packet System (EPS) and is installed outdoors. The cell coverage of the eNodeB corresponds to a macro cell.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

Hereinafter, the disclosure of this specification is described with reference to the drawings.

<Data Off (Packet Switching Data Off) Function>

As the amount of data used by users explosively increase, there is a problem in that mobile communication networks are congested, but there is a problem in that a user must pay a more service fee. Accordingly, there is a need to limit the transmission and reception of unimportant data (e.g., data that generates an application operated in background) or unwanted data.

As a part for satisfying such a need, a packet switching (PS) data off function may be introduced.

The PS data off function is configured in a UE and core network by an HPLMN, and can prevent all IP packet data except the packet data of an exempt service from being transmitted and received over a PDN connection when the function is activated by a user.

The exempt service means a permitted service even when the PS data off function is activated within the UE by the user.

Services that may be configured as the exempt service as described above are as follows.

Multi-media telephony (MMTel) voice;
SMS over IP multimedia subsystem (IMS);
Unstructured supplementary service data (USSD) over IMS (USSI);
MMTel video;
Specific IMS service not defined in 3GPP. In this case, each IMS service may be identified by an IMS communication service ID;
Device management through packet switching (PS);
IMS supplementary service configuration using a Ut interface using XCAP If a user activates the PS data off function (i.e., if data is prevented from being transmitted and received through 4G mobile communication or 5G mobile communication), the transmission of uplink data (transmission of mobile originating: hereinafter referred to as "MO") and the reception of downlink data (reception of mobile terminated: hereinafter referred to "MT") other than an exempt service are impossible.

A UE transmits the status of a PS data off function (activated or deactivated by a user) to a network node through the protocol configuration option (PCO) of an NAS Request message for SM, such as an Attach request, a PDN connectivity request (per PDN (APN)) or a Bearer Resource Modification Request (per PDN (APN)) message. In response thereto, the network node may accept or reject a change in the status of the PS data off function required by the user with respect to a corresponding PDN (APN).

Figure 7:
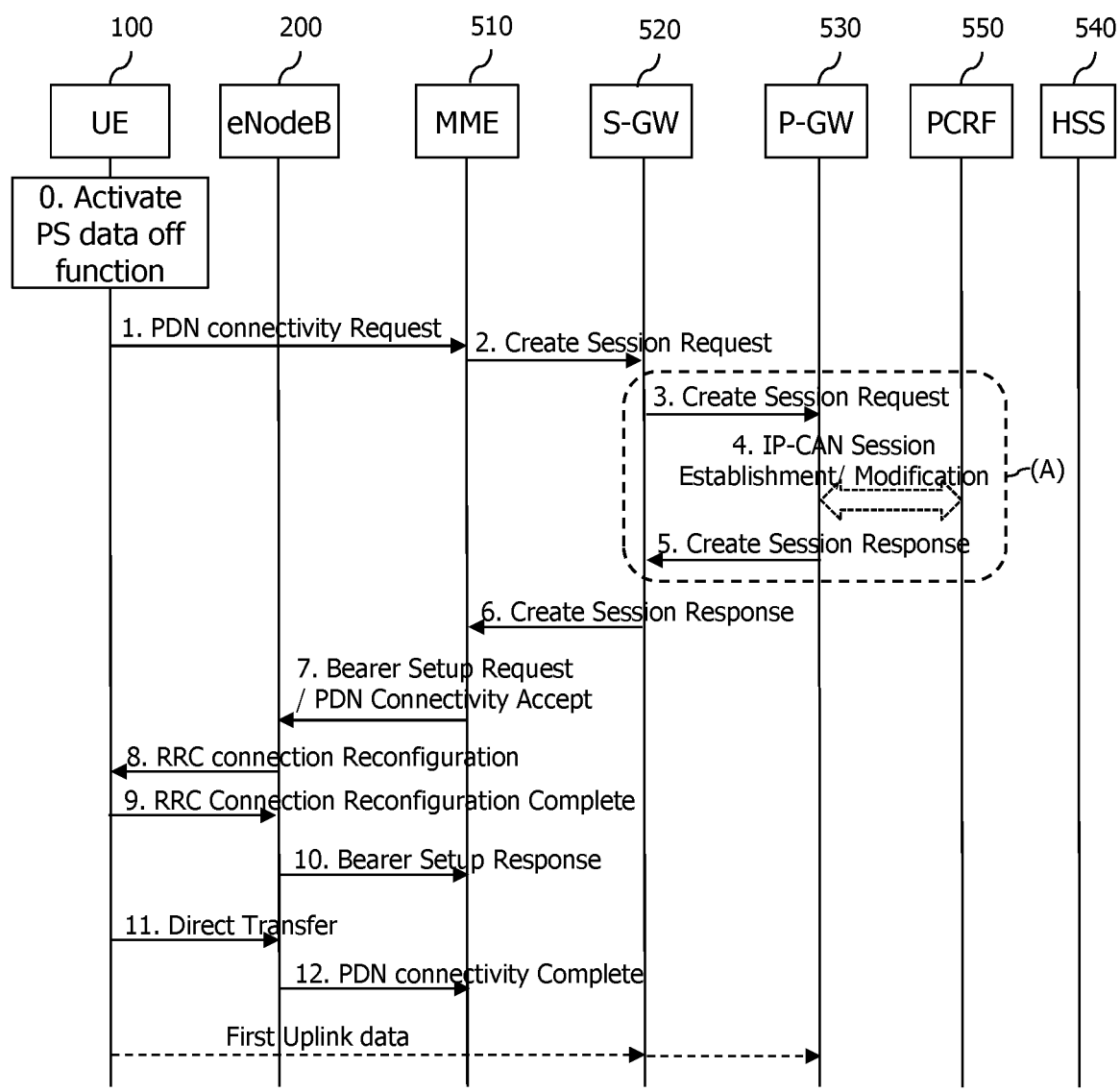
FIG. 7 shows an example in which a PS data off function is activated during a PDN connectivity request procedure.

FIG. 7 shows an example in which a PS data off function is activated during a PDN connectivity request procedure.

1) A UE 100 transmits a PDN Connectivity Request message to an MME 510. In this case, the UE 100 may transmit changed status information of the PS data off function through the PDN Connectivity Request message.

2) The MME 510 transmits a Create Session Request message to an S-GW 520 in response to the PDN Connectivity Request message.

3) In response thereto, the S-GW 520 transmits a Create Session Request message to a P-GW 530.

4) The P-GW 530 accepts a change in the status of the PS data off function, required by the user, with respect to a corresponding PDN (APN). Furthermore, the P-GW 530 and a PCRF 550 perform an IP-CAN Session Establishment Modification procedure.

5) The P-GW 530 transmits a Create Session Response message to the S-GW 520. The Create Session Response message may include information on the acceptance.

6) Meanwhile, the S-GW 520 forwards the Create Session Response message to the MME 510.

7) After the MME 510 extracts the information providing notification of the acceptance included in the received Create Session Response message, it includes the extracted information in a PDN Connectivity Accept (e.g., PDN Connectivity Accept) message and includes the PDN Connectivity Accept message in a Bearer Setup Request message, and transmits the Bearer Setup Request message to an eNodeB 200.

8) The eNodeB 200 extracts the PDN Connectivity Accept message included in the Bearer Setup Request message, and transmits the extracted PDN Connectivity Accept message to the UE 100 through an RRC Connection Reconfiguration message.

9) The UE 100 extracts the PDN Connectivity Accept message within the RRC Connection Reconfiguration message. Thereafter, the UE 100 transmits an RRC Connection Reconfiguration Complete message to the eNodeB 200.

10) The eNodeB 200 transmits a Bearer Setup Response message to the MME 510.

11~12) When the UE 100 transmits a direct transfer message to the eNodeB 200, the eNodeB 200 transmits a PDN Connectivity Complete message to the MME 510.

Meanwhile, if a PS data off function is supported between a UE and a network and the status of the PS data off function has been activated, uplink data and downlink data transmission by exempt services defined by an operator need to be possible. The network of an operator may configure a list of exempt services in a UE through a management object (MO) based on OMA DM (e.g., NAS configuration MO or new MO configuration). The list of exempt services may be previously configured in a USIM.

As a result, when a user activates a PS data off function, a UE cannot transmit uplink data according to other services except services included in a list of exempt services through a corresponding PDN.

The activation or deactivation of the PS data off function is commonly performed by a user.

Meanwhile, if a UE runs a back-off timer (e.g., T3346 (per UE) as an MM back-off timer or T3396 (per APN and UE) as an SM back-off timer provided by a network, in general, the UE cannot transmit an NAS Request message for MM or SM. That is, after a running back-off timer expires, the NAS layer of the UE may transmit the NAS Request message for MM or SM.

Consequently, if the UE runs the back-off timer, the UE cannot transmit an NAS Request message for SM (e.g., Attach Request, PDN Connectivity Request, Bearer Resource Modification Request) in order to report the changed status of the PS data off function to the network.

For example, it is assumed that while a UE attaches to a network and receives data services using a PDN connectivity #1 (i.e., in the state in which the UE has deactivated a PS data off function), the UE runs a back-off timer, for example, T3396 provided by a network node with respect to the PDN connectivity #1. In this case, it is assumed that the user wants to activate the PS data off function in order to use WiFi. In such a condition, the UE now runs T3396, and cannot notify the network that the status of the PS data off function has changed from deactivation to activation. For this reason, the network transmits all downlink data, corresponding to other services in addition to an exempt service, to the UE through the PDN connectivity #1. Accordingly, billing is assigned to the UE. Even worse, although the running T3396 is an idle state, the UE cannot respond to a paging signal. Accordingly, there are problems in that downlink data is received and billing may be assigned.

In summary, if the UE runs the back-off timer, it cannot transmit an NAS Request message. Accordingly, there is a problem in that the user cannot notify the network of a change in the status of the PS data off function, that is, activated or deactivated change contents. For this reason, the resources of a mobile communication network are wasted and billing is increased because the data of the user undesirably passes through the mobile communication network, thereby degrading user experiences.

<Disclosure of this Specification>

1. Proposal 1: if a UE runs an SM back-off timer (i.e., T3396 timer) in association with a specific APN in an RRC connection state When the user attempts to activate or deactivate a PS data off function, although the SM back-off timer (i.e., T3396 timer) is run in association with the specific APN, the NAS layer of the UE may transmit a Bearer Resource Modification Request message (with a specific APN) to a network node of the specific APN. To this end, the UE may override the running SM back-off timer (i.e., T3396 timer). In this case, the UE may transmit the Bearer Resource Modification Request message (with a specific APN) only when the UE is previously notified that the P-GW of a corresponding PDN supports the PS data off function. The Bearer Resource Modification Request message may include information indicative of the status of the PS data off function.

2. Proposal 2: if a UE runs an SM back-off timer (i.e., T3396 timer) regardless of a specific APN in an RRC connection state When the user attempts to activate or deactivate a PS data off function, although the SM back-off timer (i.e., T3396 timer) is run regardless of the specific APN, the NAS layer of the UE may transmit a Bearer Resource Modification Request message (without an APN) to a network node of a PDN. To this end, the UE may override the running SM back-off timer (i.e., T3396 timer). In this case, the UE may transmit the Bearer Resource Modification Request message (with a specific APN) only when the UE is previously notified that the P-GW of a corresponding PDN supports the PS data off function. The Bearer Resource Modification Request message may include information indicative of the status of the PS data off function. The Bearer Resource Modification Request message may include information indicative of the status of the PS data off function.

Figure 8:
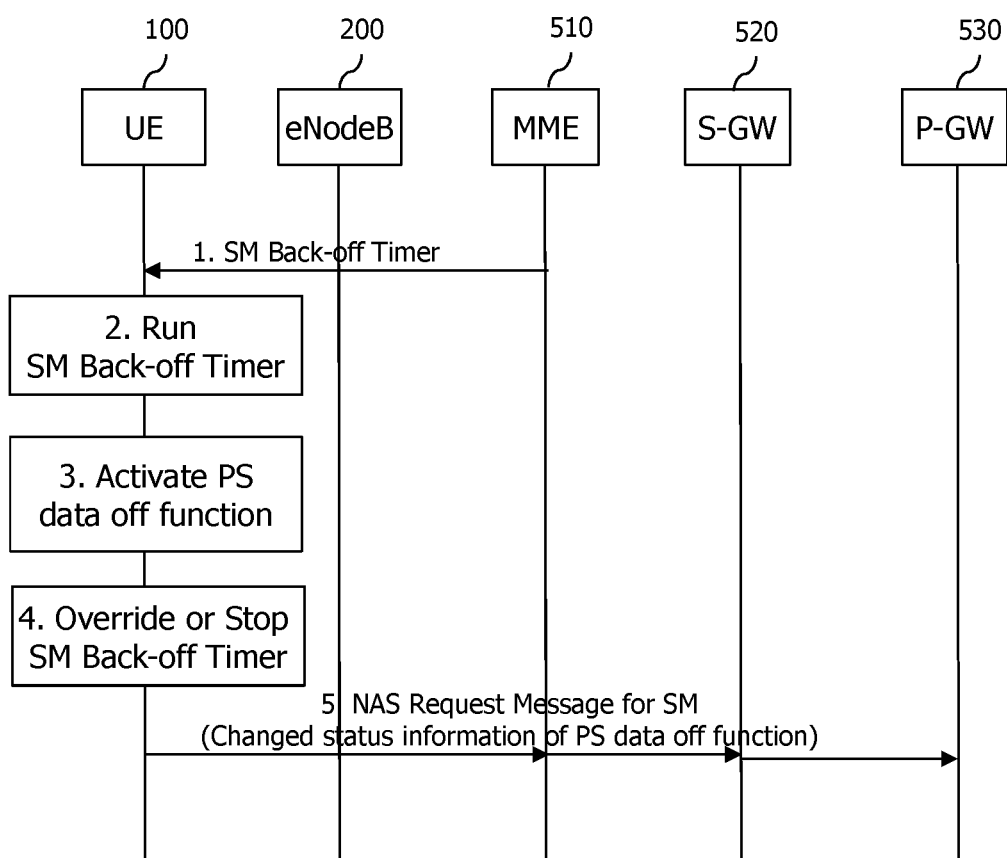
FIG. 8 is a flowchart illustrating Proposal 1 or Proposal 2 disclosed in this specification.

FIG. 8 is a flowchart illustrating Proposal 1 or Proposal 2 disclosed in this specification.

1-2) First, a UE 100 receives information on an SM back-off timer (i.e., T3396 timer) and runs the SM back-off timer. In this case, the SM back-off timer (i.e., T3396 timer) may be included in the Reject message of a network (e.g., MME/SGSN) for an NAS Request message for SM, such as an Attach Request message, a PDN Request message, a Bearer Resource Allocation Request message or a Bearer Resource Modification Request message transmitted by the UE 100, and may be received and run.

3) A user activates or deactivates a PS data off function.

4) If the SM back-off timer is run in association with a specific APN, the NAS layer of the UE 100 overrides/stops the SM back-off timer being run in association with a corresponding APN. Alternatively, if the SM back-off timer is run regardless of a specific APN, the NAS layer of the UE 100 overrides/stops the running SM back-off timer.

5) Furthermore, the NAS layer of the UE 100 transmits changed status information of the PS data off function via a PCO within an NAS Request message for SM (e.g., a Bearer Resource Modification Request message, a PDN Connectivity Request message).

3. Proposal 3: if a UE runs an MM back-off timer (i.e., T3346 timer) in an RRC idle state, When the user attempts to activate or deactivate a PS data off function, although the MM back-off timer (i.e., T3346 timer) is running, the UE may first transmit a Service Request message (or Extended Service Request message or a control plane (CP) service request message) in order to transmit a Bearer Resource Modification Request message (with a specific APN or without an APN) or a PDN Connectivity Request message. Furthermore, although the MM back-off timer (i.e., T3346 timer) is running, the UE may transmit an Attach Request message. In other words, a change in the status of the PS data off function needs to be transmitted to a network through an NAS Request message for SM, but in order to transmit the NAS Request message for SM, the UE may need to first transmit an NAS Request message for MM (e.g., Service Request message, Extended Service Request message, CP Service Request message or Attach Request message). To this end, the UE may override the running MM back-off timer (i.e., T3346 timer). Accordingly, the UE may include information on a cause of overriding the MM back-off timer (i.e., T3346 timer) in the request message for MM. For example, the NAS Request message for MM may include information indicating that the cause is related to the PS data off function, information for providing notification of a change in the status of the PS data off function, and information for subsequently transmitting an important SM NAS signaling request message, as the cause of overriding the MM back-off timer (i.e., T3346 timer).

Figure 9:
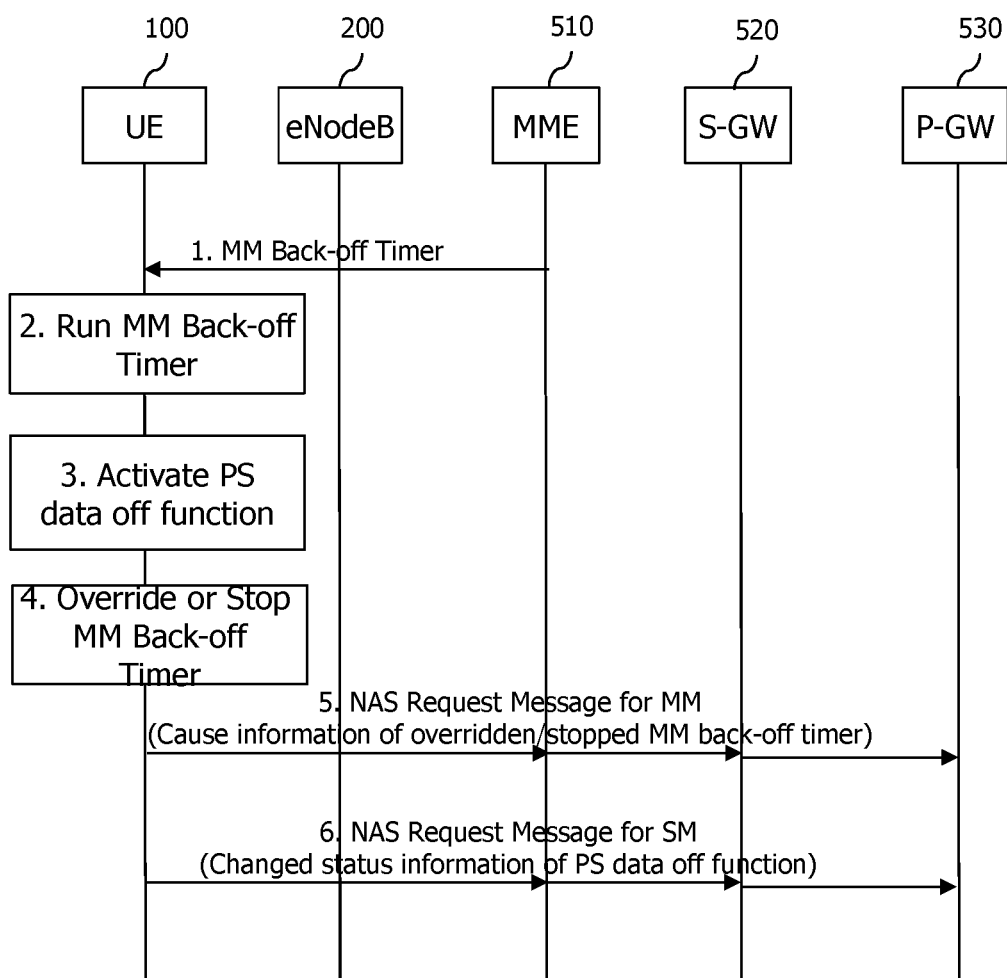
FIG. 9 is a flowchart illustrating Proposal 3 disclosed in this specification.

FIG. 9 is a flowchart illustrating Proposal 3 disclosed in this specification.

1-2) First, a UE 100 receives and runs information on an MM back-off timer (i.e., T3346 timer). In this case, the MM back-off timer (i.e., T3346 timer) may be included in the Reject message of a network (e.g., MME/SGSN) for an NAS Request message for MM, such as an Attach Request message, a tracking area update (TAU) request message, a routing area update (RAU) request message, a Service Request message, an Extended Service Request message or a CP Service Request message transmitted by the UE, and may be received and run.

3) A user activates or deactivates a PS data off function.

4) The NAS layer of the UE 100 overrides/stops the MM back-off timer.

5) Furthermore, the NAS layer of the UE 100 transmits cause information that overrides the MM back-off timer (i.e., T3346 timer) through an NAS Request message for MM.

6) Furthermore, the NAS layer of the UE 100 transmits changed status information of a PS data off function through a PCO within an NAS Request message for SM (e.g., Bearer Resource Modification Request message, PDN Connectivity Request message). In this case, although an SM back-off timer (i.e., T3396) is run, the NAS layer overrides/stops the SM back-off timer, and transmits the changed status information of the PS data off function through the PCO within the NAS Request message for SM (e.g., Bearer Resource Modification Request message, PDN Connectivity Request message). An example of the condition in which the MM back-off timer and the SM back-off timer are run at the same time as described above is described more specifically below with reference to FIG. 10.

Figure 10:
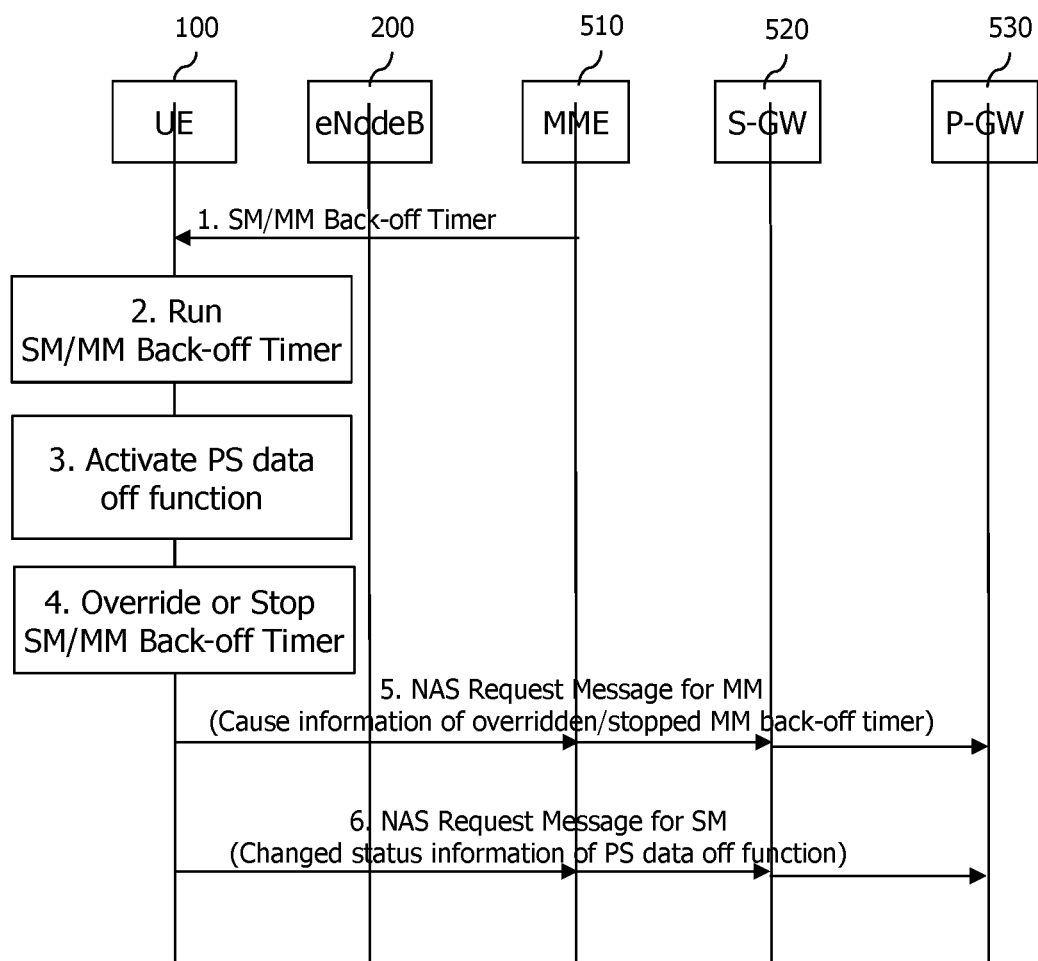
FIG. 10 is a flowchart illustrating a modified example of Proposal 3 disclosed in this specification.

FIG. 10 is a flowchart illustrating a modified example of Proposal 3 disclosed in this specification.

1-2) First, a UE 100 receives information on an SM back-off timer (i.e., T3396 timer) and runs the timer. Furthermore, the UE 100 receives information on an MM back-off timer (i.e., T3346 timer) and runs the timer.

3) A user activates or deactivates the PS data off function.

4) The NAS layer of the UE 100 overrides/stops the SM back-off timer. The NAS layer of the UE 100 also overrides/stops the MM back-off timer.

5) Furthermore, the NAS layer of the UE 100 transmits cause information for overriding the MM back-off timer (i.e., T3346 timer) through an NAS Request message for MM.

6) Furthermore, the NAS layer of the UE 100 transmits changed status information of the PS data off function through a PCO within an NAS Request message for SM (e.g., a Bearer Resource Modification Request message, a PDN Connectivity Request message).

Meanwhile, in order to transmit the NAS Request message for MM, the RRC layer of the UE needs to first perform an RRC connection establishment procedure. Furthermore, the RRC layer of the UE needs to first perform access control on RRC connection establishment. In other words, if RRC connection establishment is not blocked based on a blocking test according to access control, the UE may transmit an RRC Connection Establishment Request message, may then transmits the NAS Request message for MM (e.g., Service Request message), and may then provide notification of a change in the status of the PS data off function through the NAS Request message for SM (e.g., Bearer Resource Modification Request message). If a network is a congestion state, however, the possibility that transmission will fail cannot be excluded because the RRC connection establishment request is blocked according to the access control.

Accordingly, this specification proposes the improvement of operations of the NAS layer and RRC layer of the UE as follows in order to solve a problem, such as that described above.

Prior to the transmission of an NAS Request message for SM (e.g., Bearer Resource Modification Request message (with a specific APN or without an APN) or PDN Connectivity Request message) for providing notification that the status of a PS data off function changes to activation or deactivation, if an NAS Request message for MM (e.g., Service Request message) needs to be first transmitted and an RRC connection establishment procedure needs to be first performed before (i.e., before the NAS Request message for MM is transmitted), the NAS layer of the UE provides the RRC layer with indication indicative of the skip of access control or a call type to perform the skip of access control and/or an RRC establishment cause field or a specific category. In response thereto, the RRC layer of the UE skips or bypasses the blocking test of the access control based on the information received from the NAS layer.

Furthermore, although the NAS layer of the UE has received indication indicating that access to a cell has been blocked from the RRC layer, the NAS layer of the UE may override the blocking indication, and may first transmit the NAS Request message for MM (e.g., Service Request message) to the RRC layer in order to transmit the NAS Request message for SM (e.g., Bearer Resource Modification Request message (with a specific APN or without an APN) or PDN Connectivity Request message). In this case, the NAS layer of the UE may provide the RRC layer with skip indication or a specific request type and/or a specific value or specific category of an RRC establishment cause field for enabling the blocking test of access control on an RRC connection establishment procedure for the transmission of the corresponding NAS Request message to be skipped. In response thereto, the RRC layer of the UE skips or bypasses the blocking test of the access control based on the information received from the NAS layer.

The above-described access control may include access class barring (ACB), extended access barring (EAB), application-specific congestion control for data communication (ACDC). Accordingly, the above contents may correspond to and may be applied to the ACB, EAB, ACDC.

4. Proposal 4: if a UE runs an SM back-off timer (i.e., T3396 timer) in association with a specific APN or runs the SM back-off timer regardless of a specific APN in an RRC connection state When a user attempts to activate or deactivate a PS data off function, if the SM back-off timer is run in association with the specific APN, the NAS layer of the UE stores a time stamp for one point of time at which the user attempted to activate or deactivate the PS data off function without transmitting an NAS Request message for SM (e.g., Bearer Resource Modification Request message, a PDN Connectivity Request message) or an NAS Request message for MM over a PDN related to the corresponding APN.

Thereafter, when the corresponding SM back-off timer expires, the UE may calculate a time difference value between the point of time of the time stamp and a point of time at which the timer expired, and may transmit information on the calculated time difference value through an NAS Request message for SM (e.g., Bearer Resource Modification Request message, PDN Connectivity Request message) or an NAS Request message for MM.

Alternatively, the UE may transmit information on the point of time of the time stamp and information on the point of time at which the timer expired through the message.

That is, in the former case, an accurate time difference value is calculated by the UE and provided to a network. In the latter case, when the UE provides the network with the information on the two points of time, the network calculates a difference value between the two points of time.

A target of the transmission may be an MME/SGSN and/or a P-GW. In response thereto, the P-GW uses the received information to calculate billing for the UE. For example, the P-GW may stop the addition of billing for the corresponding UE based on a point of time at which the user activated the PS data off function.

In this case, the Bearer Resource Modification Request message (with a specific APN) may be transmitted only when the UE is previously notified that the P-GW of a corresponding PDN supports the PS data off function. The Bearer Resource Modification Request message may include information indicative of the status of the PS data off function.

Proposal 3 may be applied along with Proposal 1 or along with Proposal 2, or along with Proposal 4 or may be applied along with Proposal 1, Proposal 2, and Proposal 4.

In Proposal 1 or Proposal 2 to Proposal 4, the Bearer Resource Modification Request message, the Attach Request message, and the PDN Connectivity Request message are NAS Request messages transmitted to notify the network of the changed status of the PS data off function.

Meanwhile, the above-described SM back-off timer (i.e., T3396 timer) may be included in the Reject message of a network (e.g., MME/SGSN) for an NAS Request message for SM, such as an Attach Request message, a PDN request message, a Bearer Resource Allocation Request message, or a Bearer Resource Modification Request message transmitted by a UE, and may be received and run. Furthermore, the above-described MM back-off timer (e.g., T3346 timer) may be included in the Reject message of a network (e.g., MME/SGSN) for an NAS Request message for MM, such as an Attach Request message, a tracking area update (TAU) request message, a routing area update (RAU) request message, a Service Request message, an Extended Service Request message, or a CP Service Request message transmitted by a UE, and may be received and run.

Meanwhile, in a conventional technology, in the state in which an MM back-off timer or SM back-off timer provided from a network (e.g., MME/SGSN) to a UE is checked to have not expired, when an NAS Request message is received from a UE again, the network (e.g., MME/SGSN) could reject the NAS Request message again. In contrast, according to Proposal 1 or Proposal 2 to Proposal 4, the network (e.g., MME/SGSN) cannot reject the NAS Request message again and must accept it. That is, the network (e.g., MME/SGSN) performs acceptance with reference to changed status information of a PS data off function included in the NAS Request message for SM. Likewise, the network (e.g., MME/SGSN) performs acceptance with reference to cause information included in an NAS Request message for MM. Alternatively, the UE may configure a low priority indicator as "MS is not configured for NAS signaling low priority" in the NAS Request message for SM or MM, and may transmit the low priority indicator to the network (e.g., MME/SGSN). In response thereto, the network cannot reject the NAS Request message for SM or MM, and may perform acceptance. Alternatively, the UE may configure a low priority indicator as "MS is not configured for NAS signaling low priority" in the NAS Request message for SM or MM along with the cause information, and may transmit the low priority indicator to the network (e.g., MME/SGSN). In response thereto, the network cannot reject the NAS Request message for SM or MM, and may perform acceptance.

Meanwhile, according to the proposals of this specification, it has been described above that although an MM back-off timer (e.g., T3346 timer) and/or an SM back-off timer (i.e., T3396 timer) is run, a UE may override the back-off timer. The overriding of the timer may be possible only when the UE is configured to override the back-off time for PS data off. The configuration may be performed through an NAS configuration MO or new MO or may be performed through a USIM.

The proposals may be combined and used.

The contents described so far may be implemented in hardware. This is described with reference to the drawing.

Figure 11:
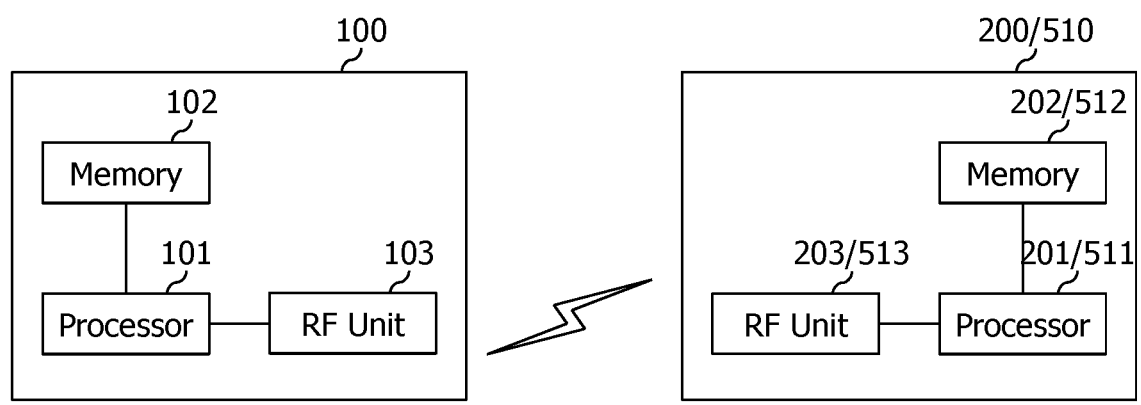
FIG. 11 is a block diagram of a UE 100 and a network apparatus according to an embodiment of the present invention.

FIG. 11 is a block diagram of the UE 100 and a network apparatus according to an embodiment of the present invention.

As shown in FIG. 11, the UE 100 includes a processor 101, memory 102 and a transceiver unit 103. Furthermore, the network apparatus may be the eNodeB 200 or the MME/SGSN 510. The network apparatus 200 or 510 includes a processor 201 or 511, memory 202 or 512 and a transceiver unit 203 or 513.

The memory 102, 202 or 512 stores the above-described method.

The processor 101, 201 or 511 controls the memory 102, 202 or 512 and the transceiver unit 103, 203 or 513. Specifically, the processor 101, 201 or 511 executes the methods stored in the memory 102, 202 or 512. Furthermore, the processor 101, 201 or 511 transmits the above-described signals through the transceiver unit 103, 203 or 513.

Although the preferred embodiments of the present invention have been illustrated, the scope of the present invention is not limited to the specific embodiments and therefore the present invention may be modified, changed, or improved in various ways within the spirit of the present invention and the category of the claims.

What is claimed is:

1. A method for using a packet switching (PS) data off function, the method performed by a user equipment (UE) and comprising:
    determining whether a session management (SM) back-off timer or a mobility management (MM) back-off timer is running, if a non-access stratum (NAS) request message for an SM needs to be transmitted due to an activation request or a deactivation request of the PS data off function; and
    transmitting, by an NAS layer of the UE, the NAS request message for the SM including information on an activation status or a deactivation status of the PS data off function.

2. The method of claim 1, further comprising:
    overriding or stopping the SM back-off timer or the MM back-off timer before the SM back-off timer or the MM back-off timer expires, if it is determined that the SM back-off timer or the MM back-off timer is running.

3. The method of claim 2, wherein the NAS request message for the SM includes
    cause information representing why the SM back-off timer or the MM back-off timer is overridden, or
    an indicator representing that the NAS request message is not configured with a low priority.

4. The method of claim 1, further comprising:
    recoding in a timestamp a time point when the PS data off function needs to be activated or deactivated, if it is determined that the SM back-off timer or the MM back-off timer is running; and
    wherein the NAS request message for the SM is transmitted when the SM back-off timer or the MM back-off timer expires.

5. The method of claim 4, wherein the NAS request message for the SM includes:
    information on a difference value between the time point identified by the timestamp and a time point when the SM back-off timer or the MM back-off timer expires.

6. The method of claim 4, wherein the NAS request message for the SM further includes the timestamp.

7. The method of claim 1, further comprising:
    overriding or stopping the MM back-off timer before the MM back-off timer expires, if it is determined that the MM back-off timer is running; and
    transmitting a NAS request message for the MM before transmitting the NAS request message for the SM.

8. The method of claim 7, further comprising:
    delivering, by the NAS layer and to a radio resource control (RRC) layer, an indication for instructing to skip a barring check for an access control, a call type, a value for an RRC establishment cause field or category information, if an RRC connection establishment procedure is needed before transmitting the NAS request message for the MM.

9. The method of claim 8, wherein the access control includes at least one of:
    an access class barring (ACB), an extended access barring (EAB), and an application specific congestion control for data communication (ACDC).

10. The method of claim 7, wherein the NAS request message for the MM further includes:
    cause information representing why the SM back-off timer or the MM back-off timer is overridden, or
    an indicator representing that the NAS request message is not configured with a low priority.

11. A user equipment (UE) for using a packet switching (PS) data off function, the UE comprising:
    a transceiver; and
    a processor which controls the transceiver, wherein the processor performs:
        determining whether a session management (SM) back-off timer or a mobility management (MM) back-off timer is running, if a non-access stratum (NAS) request message for an SM needs to be transmitted due to an activation request or a deactivation request of the PS data off function; and
        transmitting, by an NAS layer, the NAS request message for the SM including information on an activation status or a deactivation status of the PS data off function.

12. The UE of claim 11, wherein the processor overrides or stops the SM back-off timer or the MM back-off timer before the SM back-off timer or the MM back-off timer expires, if it is determined that the SM back-off timer or the MM back-off timer is running.

13. The UE of claim 11, wherein the processor inserts, into the NAS request message for the SM, cause information representing why the SM back-off timer or the MM back-off timer is overridden, or an indicator representing that the NAS request message is not configured with a low priority.

14. The UE of claim 11, wherein the processor records in a timestamp a time point when the PS data off function needs to be activated or deactivated, if it is determined that the SM back-off timer or the MM back-off timer is running; and wherein the NAS request message for the SM is transmitted when the SM back-off timer or the MM back-off timer expires.

15. The UE of claim 14, wherein the NAS request message for the SM includes:
   information on a difference value between the time point identified by the timestamp and a time point when the SM back-off timer or the MM back-off timer expires.

16. The UE of claim 14, wherein the NAS request message for the SM further includes the timestamp.

17. The UE of claim 11, wherein the processor
   overrides or stops the MM back-off timer before the MM back-off timer expires, if it is determined that the MM back-off timer is running; and
   transmits a NAS request message for the MM before transmitting the NAS request message for the SM.

18. The UE of claim 17, wherein the processor inserts, in the NAS request message for the MM, cause information representing why the SM back-off timer or the MM back-off timer is overridden, or an indicator representing that the NAS request message is not configured with a low priority.

\* \* \* \* \*